(12) United States Patent
Rowland et al.

(10) Patent No.: US 8,064,071 B2
(45) Date of Patent: Nov. 22, 2011

(54) FLOATING SHEET MEASUREMENT APPARATUS AND METHOD

(75) Inventors: Christopher A. Rowland, Rockport, MA (US); Peter L. Kellerman, Essex, MA (US); Frank Sinclair, Quincy, MA (US); Julian G. Blake, Gloucester, MA (US); Nicholas P. T. Bateman, Reading, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 212 days.

(21) Appl. No.: 12/403,200

(22) Filed: Mar. 12, 2009

(65) Prior Publication Data

US 2009/0231597 A1    Sep. 17, 2009

Related U.S. Application Data

(60) Provisional application No. 61/036,578, filed on Mar. 14, 2008.

(51) Int. Cl.
*G01B 11/14*    (2006.01)

(52) U.S. Cl. .......... 356/625; 356/635; 438/15; 438/696; 23/308 R

(58) Field of Classification Search .......... 356/625–640; 438/696, 15; 23/308 R
See application file for complete search history.

(56) References Cited

U.S. PATENT DOCUMENTS

| | | | |
|---|---|---|---|
| 3,430,680 A | 3/1969 | Leghorn | |
| 3,607,115 A | 9/1971 | Bleil | |
| 3,681,033 A | 8/1972 | Bleil | |
| 3,759,671 A | 9/1973 | Bleil | |
| 4,121,965 A | 10/1978 | Leipold | |
| 4,226,834 A | 10/1980 | Shudo et al. | |
| 4,264,407 A | 4/1981 | Shudo et al. | |
| 4,289,571 A | 9/1981 | Jewett | |
| 4,316,764 A | 2/1982 | Kudo et al. | |
| 4,322,263 A | 3/1982 | Kudo et al. | |
| 4,329,195 A | 5/1982 | Kudo | |
| 4,417,944 A | 11/1983 | Jewett | |
| 4,428,783 A | 1/1984 | Gessert | |
| 4,447,289 A | 5/1984 | Geissler et al. | |
| 4,572,279 A * | 2/1986 | Lewis et al. | 164/463 |
| 4,594,229 A | 6/1986 | Ciszek et al. | |
| 4,599,132 A | 7/1986 | Jewett et al. | |
| 4,613,471 A * | 9/1986 | Harris | 264/40.1 |
| 4,873,063 A | 10/1989 | Bleil | |

(Continued)

FOREIGN PATENT DOCUMENTS

JP    2006-275750 A    10/2006

OTHER PUBLICATIONS

D.N. Jewett et al., "Progress in Growth of Silicon Ribbon by a Low Angle, High Rate Process," Photovoltaic Specialists Conference, 16th, San Diego, CA, Sep. 27-30, 1982, pp. 86-89, Institute of Electrical and Electronics Engineers, New York, NY, USA.

(Continued)

*Primary Examiner* — Hoa Pham

(57) ABSTRACT

A sheet measurement apparatus has a sheet disposed in a melt. The measurement system uses a beam to determine a dimension of the sheet. This dimension may be, for example, height or width. The beam may be, for example, collimated light, a laser, x-rays, or gamma rays. The production of the sheet may be altered based on the measurements.

20 Claims, 5 Drawing Sheets

U.S. PATENT DOCUMENTS

| | | | |
|---|---|---|---|
| 5,055,157 | A | 10/1991 | Bleil |
| 5,069,742 | A | 12/1991 | Bleil |
| 5,229,083 | A | 7/1993 | Bleil |
| 5,394,825 | A | 3/1995 | Schmid et al. |
| 5,959,737 | A * | 9/1999 | Kaminaga et al. ............ 356/430 |
| 6,090,199 | A | 7/2000 | Wallace, Jr. et al. |
| 6,250,109 | B1 * | 6/2001 | Hulek et al. ....................... 65/19 |
| 6,375,451 | B1 * | 4/2002 | Robinson et al. ............. 425/223 |
| 6,472,031 | B1 * | 10/2002 | Daecher et al. ................ 428/1.1 |
| 7,803,292 | B2 * | 9/2010 | Heki .............................. 264/1.6 |
| 2004/0253824 | A1 | 12/2004 | Volker |
| 2007/0275338 | A1 * | 11/2007 | Acker et al. ....................... 432/8 |

OTHER PUBLICATIONS

B. Kudo, "Improvements in the Horizontal Ribbon Growth Technique for Single Crystal Silicon," Journal of Crystal Growth 50, 1980, pp. 247-259, North-Holland Publishing Co., Amsterdam, Netherlands.

Bruce Chalmers, "High Speed Growth of Sheet Crystals," Journal of Crystal Growth 70, 1984, pp. 3-10, North- Holland Publishing Co., Amsterdam, Netherlands.

Paul D. Thomas & Robert A. Brown, "Rate Limits in Silicon Sheet Growth: The Connections Between Vertical and Horizontal Methods," J. of Crystal Growth 82, 1987, pp. 1-9, North-Holland Publishing Co., Amsterdam, Netherlands.

T.F. Ciszek, "Techniques for the Crystal Growth of Silicon Ingots and Ribbons," J. of Crystal Growth 66, 1984, pp. 655-672, North-Holland Publishing Co., Amsterdam, Netherlands.

M.E. Glicksman & P.W. Voorhees, "Analysis of Morphologically Stable Horizontal Ribbon Crystal Growth," J. of Electronic Materials, vol. 12, No. 1, 1983, pp. 161-179, Springer Science+Business Media, Cambridge, MA, USA.

William C. Dash, "Growth of Silicon Crystals Free from Dislocations," J. of App. Phys., vol. 30, No. 4, Apr. 1959, pp. 459-474, American Institute of Physics, Melville, NY, USA.

* cited by examiner

FLOATING SHEET MEASUREMENT APPARATUS AND METHOD

CROSS-REFERENCE TO RELATED APPLICATIONS

This application claims priority to the provisional patent application entitled "Silicon Sheet Measurement," filed Mar. 14, 2008 and assigned U.S. App. No. 61/036,578, the disclosure of which is hereby incorporated by reference.

FIELD

This invention relates to producing a sheet of material from a melt and, more particularly, to measuring a sheet of material in a melt.

BACKGROUND

Silicon wafers or sheets may be used in, for example, the integrated circuit or solar cell industry. Demand for solar cells continues to increase as the demand for renewable energy sources increases. As these demands increase, one goal of the solar cell industry is to lower the cost/power ratio. There are two types of solar cells: crystalline silicon and thin film. The majority of solar cells are made from crystalline silicon. Currently, a major cost of a crystalline silicon solar cell is the wafer on which the solar cell is made. The efficiency of the solar cell, or the amount of power produced under standard illumination, is limited, in part, by the quality of this wafer. Any reduction in the cost of manufacturing a wafer without decreasing quality will lower the cost/power ratio and enable the wider availability of this clean energy technology.

The highest efficiency solar cells may have an efficiency of greater than 20%. These are made using electronics-grade monocrystalline silicon wafers. Such wafers may be made by sawing thin slices from a monocrystalline silicon cylindrical boule grown using the Czochralski method. These slices may be less than 200 µm thick. To maintain single crystal growth, the boule must be grown slowly, such as less than 10 µm/s, from a crucible containing a melt. The subsequent sawing process leads to approximately 200 µm of kerf loss, or loss due to the width of a saw blade, per wafer. The cylindrical boule also may need to be squared off to make a square solar cell. Both the squaring and kerf losses lead to material waste and increased material costs. As solar cells become thinner, the percent of silicon waste per cut increases. Limits to ingot slicing technology, however, may hinder the ability to obtain thinner solar cells.

Other solar cells are made using wafers sawed from polycrystalline silicon ingots. Polycrystalline silicon ingots may be grown faster than monocrystalline silicon. However, the quality of the resulting wafers is lower because there are more defects and grain boundaries. This results in lower efficiency solar cells. The sawing process for a polycrystalline silicon ingot is as inefficient as a monocrystalline silicon ingot or boule.

Another solution that may reduce silicon waste is cleaving a wafer from a silicon ingot after ion implantation. For example, hydrogen, helium, or other noble gas ions are implanted beneath the surface of the silicon ingot to form an implanted region. This is followed by a thermal, physical, or chemical treatment to cleave the wafer from the ingot along this implanted region. While cleaving through ion implantation can produce wafers without kerf losses, it has yet to be proven that this method can be employed to produce silicon wafers economically.

Yet another solution is to pull a thin ribbon of silicon vertically from a melt and then allow the pulled silicon to cool and solidify into a sheet. The pull rate of this method may be limited to less than approximately 18 mm/minute. The removed latent heat during cooling and solidifying of the silicon must be removed along the vertical ribbon. This results in a large temperature gradient along the ribbon. This temperature gradient stresses the crystalline silicon ribbon and may result in poor quality multi-grain silicon. The width and thickness of the ribbon also may be limited due to this temperature gradient. For example, the width may be limited to less than 80 mm and the thickness may be limited to 180 µm.

Horizontal ribbons of silicon that are physically pulled from a melt also have been tested. A seed attached to a rod is inserted into the melt and the rod and resulting sheet are pulled at a low angle over the edge of the crucible. The angle and surface tension are balanced to prevent the melt from spilling over the crucible. It is difficult, however, to initiate and control such a pulling process. Access must be given to the crucible and melt to insert the seed, which may result in heat loss. Additional heat may be added to the crucible to compensate for this heat loss. This may cause vertical temperature gradients in the melt that may cause non-laminar fluid flow. Convective gas cooling may be used due to the large heat flow into the melt. Such convective cooling may be turbulent. The non-laminar flow of the gas and melt may prevent control of the thickness of the sheet. Furthermore, a possibly difficult angle of inclination adjustment to balance gravity and surface tension of the meniscus formed at the crucible edge must be performed. Also, since heat is being removed at the separation point of the sheet and melt, there is a sudden change between heat being removed as latent heat and heat being removed as sensible heat. This may cause a large temperature gradient along the ribbon at this separation point and may cause dislocations in the crystal. Dislocations and warping may occur due to these temperature gradients along the sheet.

Production of thin sheets separated horizontally from a melt has not been performed. Producing sheets horizontally from a melt by separation may be less expensive than silicon sliced from an ingot and may eliminate kerf loss or loss due to squaring. Sheets produced horizontally from a melt by separation also may be less expensive than silicon cleaved from an ingot using hydrogen ions or other pulled silicon ribbon methods. Furthermore, separating a sheet horizontally from a melt may improve the crystal quality of the sheet compared to pulled ribbons. A crystal growth method such as this that can reduce material costs would be a major enabling step to reduce the cost of crystalline solar cells. Any process control or measurement of the sheet may improve production. Accordingly, there is a need in the art for an improved apparatus and method measure a sheet in a melt.

SUMMARY

According to a first aspect of the invention, a sheet measurement apparatus is provided. The sheet measurement apparatus comprises a melt of a material, a sheet of the material disposed in the melt, and a measurement system that uses a beam to determine a dimension of the sheet.

According to a second aspect of the invention, a sheet measurement method is provided. The sheet measurement method comprises freezing a sheet of a material in a melt of the material and measuring a dimension of the sheet using a beam.

According to a third aspect of the invention, a sheet measurement method is provided. The sheet measurement method comprises flowing a melt of a material through a channel and cooling the melt. A sheet of the material forms on the melt. The sheet and the melt flow and a dimension of the sheet is measured using a beam. The sheet is separated from the melt using a spillway.

BRIEF DESCRIPTION OF THE DRAWINGS

For a better understanding of the present disclosure, reference is made to the accompanying drawings, which are incorporated herein by reference and in which.

DETAILED DESCRIPTION

The embodiments of the apparatus and methods herein are described in connection with solar cells. However, these also may be used to produce, for example, integrated circuits, flat panels, or other substrates known to those skilled in the art. Furthermore, while the melt is described herein as being silicon, the melt may contain germanium, silicon and germanium, or other materials known to those skilled in the art. Thus, the invention is not limited to the specific embodiments described below.

Figure 1:
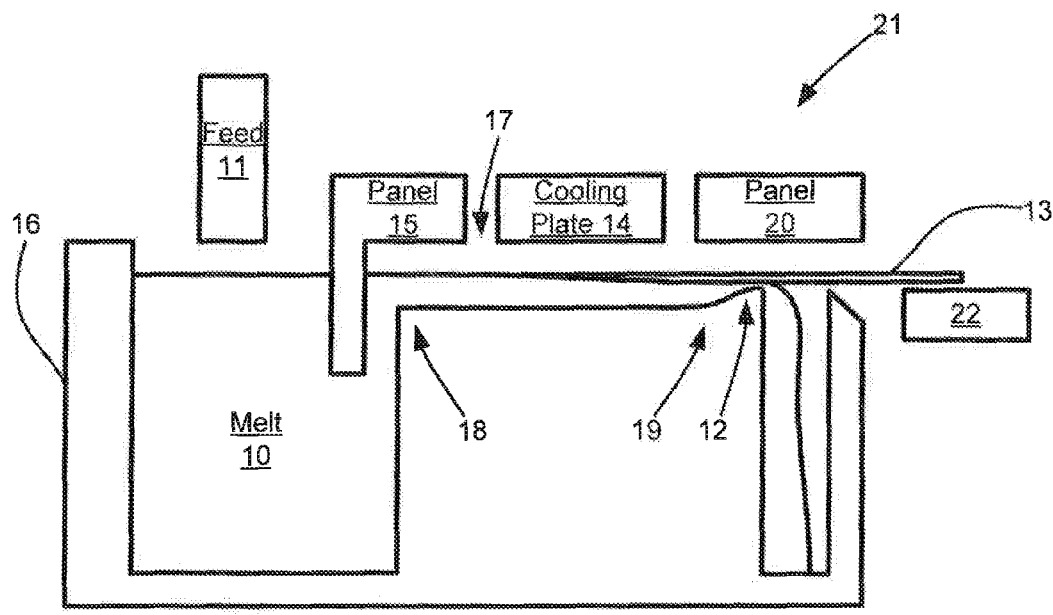
FIG. 1 is a cross-sectional side view of an embodiment of an apparatus that separates a sheet from a melt.

FIG. 1 is a cross-sectional side view of an embodiment of an apparatus that separates a sheet from a melt. The sheet-forming apparatus 21 has a vessel 16 and panels 15 and 20. The vessel 16 and panels 15 and 20 may be, for example, tungsten, boron nitride, aluminum nitride, molybdenum, graphite, silicon carbide, or quartz. The vessel 16 is configured to contain a melt 10. The melt 10 may be silicon. The melt 10 may be replenished through the feed 11 in one embodiment. The feed 11 may contain solid silicon or solid silicon and germanium. The melt 10 may be pumped into the vessel 16 in another embodiment. A sheet 13 will be formed on the melt 10. In one instance, the sheet 13 will at least partly float within the melt 10. While the sheet 13 is illustrated in FIG. 1 as floating in the melt 10, the sheet 13 may be at least partially submerged in the melt 10 or may float on top of the melt 10. In one instance, only 10% of the sheet 13 protrudes from above the top of the melt 10. The melt 10 may circulate within the apparatus 21.

This vessel 16 defines at least one channel 17. This channel 17 is configured to hold the melt 10 and the melt 10 flows from a first point 18 to a second point 19 of the channel 17. In one instance, the environment within the channel 17 is still to prevent ripples in the melt 10. The melt 10 may flow due to, for example, a pressure difference, gravity, or other methods of transport. The melt 10 then flows over the spillway 12. This spillway 12 may be a ramp, a weir, a small dam, or a corner and is not limited to the embodiment illustrated in FIG. 1. The spillway 12 may be any shape that allows a sheet 13 to be separated from the melt 10.

The panel 15 is configured in this particular embodiment to extend in part below the surface of the melt 10. This may prevent waves or ripples from disturbing the sheet 13 as it forms on the melt 10. These waves or ripples may form due to addition of melt material from the feed 11, pumping, or other causes known to those skilled in the art.

In one particular embodiment, the vessel 16 and panels 15 and 20 may be maintained at a temperature slightly above approximately 1687 K. For silicon, 1687 K represents the crystallization temperature ($T_c$). By maintaining the temperature of the vessel 16 and panels 15 and 20 to slightly above $T_c$, the cooling plate 14 may function using radiation cooling to obtain the desired freezing rate of the sheet 13 on or in the melt 10. The cooling plate 14 in this particular embodiment is composed of a single segment or section. The bottom 25 of the channel 17 may be heated above $T_c$ to create a small vertical temperature gradient in the melt 10 to prevent constitutional supercooling or the formation of dendrites, or branching projections, on the sheet 13. However, the vessel 16 and panels 15 and 20 may be any temperature above the melting temperature of the melt 10. This prevents the melt 10 from solidifying on the vessel 16 and panels 15 and 20.

The apparatus 21 may be maintained at a temperature slightly above $T_c$ by at least partially or totally enclosing the apparatus 21 within an enclosure. If the enclosure maintains the apparatus 21 at a temperature above $T_c$, the need to heat the apparatus 21 may be avoided or reduced and heaters in or around the enclosure may compensate for any heat loss. This enclosure 26 may be isothermal with non-isotropic conductivity. In another particular embodiment, the heaters are not disposed on or in the enclosure and are rather in the apparatus 21. In one instance, different regions of the vessel 16 may be heated to different temperatures by imbedding heaters within the vessel 16 and using multi-zone temperature control.

The enclosure 26 may control the environment where the apparatus 21 is disposed. In a specific embodiment, the enclosure 26 contains an inert gas. This inert gas may be maintained at above $T_c$. The inert gas may reduce the addition of solutes into the melt 10 that may cause constitutional instabilities during the sheet 13 formation process.

The apparatus 21 includes a cooling plate 14. The cooling plate 14 allows heat extraction as the sheet 13 forms on the melt 10. The cooling plate 14 may cause the sheet 13 to freeze on or in the melt 10 when the cooling plate 14 is lowered below the freezing temperature of the melt 10. This cooling plate 14 may use radiation cooling and may be fabricated of, for example, graphite or silicon carbide. The cooling plate 14 may remove heat from the liquid melt 10 quickly, uniformly, and in controlled amounts. Disturbances to the melt 10 may be reduced while the sheet 13 forms to prevent imperfections.

The heat extraction of the heat of fusion over the surface of the melt 10 may enable faster production of the sheet 13 compared to other ribbon pulling methods while maintaining a sheet 13 with low defect density. Cooling a sheet 13 on the surface of the melt 10 or a sheet 13 that floats on the melt 10 allows the latent heat of fusion to be removed slowly and over a large area while having a large horizontal flow rate. While vertical pulling of a sheet from a melt may have a crystal growth rate of greater than approximately 300 µm/s (18 mm/min), embodiments of the apparatus and method described herein may have a much lower crystal growth rate, close to that of Czochralski growth. The crystal growth rate may be less than approximately 10 µm/s in one instance.

When a sheet is pulled vertically out of the melt surface, the latent heat must be removed along the sheet. The crystallization area, or sheet thickness multiplied by sheet width, may be small. A high temperature gradient is required to pull a sheet vertically at approximately 18 mm/min. Using such a vertical pull method may lead to a poor quality crystal. Cooling the sheet 13 on the surface of the melt 10 or a sheet 13 that floats on the melt 10, besides improving the quality of the sheet 13, also may increase the speed of production and size of the sheet 13 compared to ribbons pulled normal to the surface of a melt.

The dimensions of the cooling plate 14 may be increased, both in length and width. Increasing the length may allow a faster melt 10 flow rate for the same vertical growth rate and resulting sheet 13 thickness. Increasing the width of the cooling plate 14 may result in a wider sheet 13. Unlike the vertical sheet pulling method, there is no inherent physical limitation on the width of the sheet 13 produced using embodiments of the apparatus and method described herein.

In one particular example, the melt 10 and sheet 13 flow at a rate of approximately 1 cm/s. The cooling plate 14 is approximately 20 cm in length and approximately 25 cm in width. A sheet 13 may be grown to approximately 100 μm in thickness in approximately 20 seconds. Thus, the sheet may grow in thickness at a rate of approximately 5 μm/s. A sheet 13 of approximately 100 μm in thickness may be produced at a rate of approximately 10 $m^2$/hour.

Thermal gradients in the melt 10 may be minimized in one embodiment. This may allow the melt 10 flow to be laminar and may allow the sheet 13 to be formed via radiation cooling using the cooling plate 14. A temperature difference of approximately 300 K between the cooling plate 14 and the melt 10 may form the sheet 13 on or in the melt 10 at a rate of 7 μm/s.

The region of the channel 17 downstream from the cooling plate 14 and the under the panel 20 may be isothermal. This isothermal region may allow annealing of the sheet 13.

After the sheet 13 is formed on the melt 10, the sheet 13 is separated from the melt 10 using the spillway 12. The melt 10 flows from the first point 18 to the second point 19 of the channel 17. The sheet 13 will flow with the melt 10. This transport of the sheet 13 may be a continuous motion. In one instance, the sheet 13 may flow at approximately the same speed that the melt 10 flows. Thus, the sheet 13 may form and be transported while at rest with respect to the melt 10. The shape of the spillway 12 or orientation of the spillway 12 may be altered to change the velocity profile of the sheet 13.

The melt 10 is separated from the sheet 13 at the spillway 12. In one embodiment, the flow of the melt 10 transports the melt 10 over the spillway 12 and may, at least in part, transport the sheet 13 over the spillway 12. This may minimize or prevent breaking the crystal in the sheet 13 because no external stress is applied to the sheet 13. The melt 10 will flow over the spillway 12 away from the sheet 13 in this particular embodiment. Cooling may not be applied at the spillway 12 to prevent thermal shock to the sheet 13. In one embodiment, the separation at the spillway 12 occurs in near-isothermal conditions.

The sheet 13 may be formed faster in the apparatus 21 than by being pulled normal to the melt because the melt 10 may flow at a speed configured to allow for proper cooling and crystallization of the sheet 13 on the melt 10. The sheet 13 will flow approximately as fast as the melt 10 flows. This reduces stress on the sheet 13. Pulling a ribbon normal to a melt is limited in speed because of the stresses placed on the ribbon due to the pulling. The sheet 13 in the apparatus 21 may lack any such pulling stresses in one embodiment. This may increase the quality of the sheet 13 and the production speed of the sheet 13.

The sheet 13 may tend to go straight beyond the spillway 12 in one embodiment. This sheet 13 may be supported after going over the spillway 12 in some instances to prevent breakage. A support device 22 is configured to is support the sheet 13. The support device 22 may provides a gas pressure differential to support the sheet 13 using, for example, a gas or air blower. After the sheet 13 is separated from the melt 10, the temperature of the environment where the sheet 13 is located may slowly be changed. In one instance, the temperature is lowered as the sheet 13 moves farther from the spillway 12.

In one instance, the growth of the sheet 13, annealing of the sheet 13, and separation of the sheet 13 from the melt 10 using the spillway 12 may take place in an isothermal environment. The separation using the spillway 12 and the approximately equal flow rates of the sheet 13 and melt 10 minimize stress or mechanical strain on the sheet 13. This increases the possibility of producing a single crystal sheet 13.

In another embodiment, a magnetic field is applied to the melt 10 and sheet 13 in the apparatus 21. This may dampen non-laminar flows within the melt 10 and may improve crystallization of the sheet 13.

Figure 2:
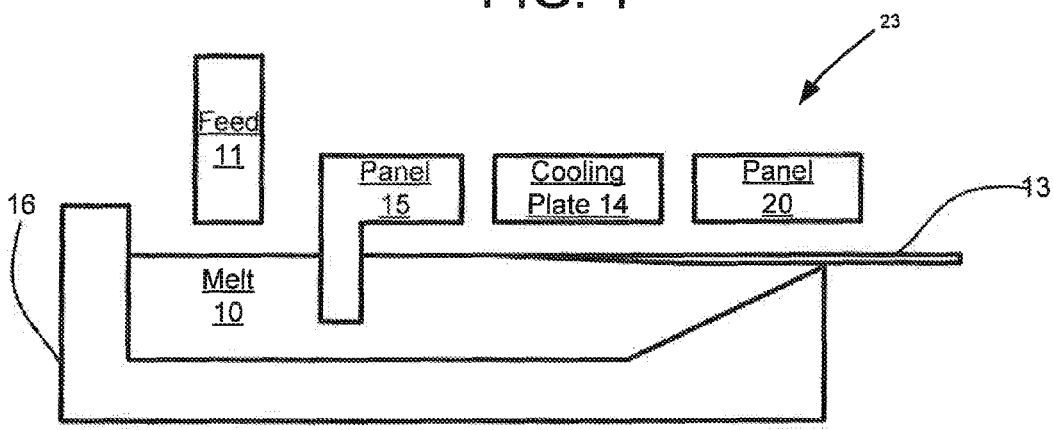
FIG. 2 is a cross-sectional side view of an embodiment of an apparatus that pulls a sheet from a melt.

FIG. 2 is a cross-sectional side view of an embodiment of an apparatus that pulls a sheet from a melt. In this embodiment, the apparatus 23 pulls the sheet 13 from the melt 10. The sheet 13 may be pulled using a seed. A sheet 13 may be formed through cooling by the cooling plate 14 and the resulting sheet may be drawn out of the melt 10.

Both the embodiments of FIGS. 1-2 use a cooling plate 14. Different cooling temperatures across the length of the cooling plate 14, different flow rates of the melt 10 or pull speeds of the sheet 13, the length of the various sections of the apparatus 21 or apparatus 23, or the timing within the apparatus 21 or apparatus 23 may be used for process control. If the melt 10 is silicon, a polycrystalline sheet 13 or single crystal sheet 13 may be formed in the apparatus 21. In either the embodiment of FIG. 1 or FIG. 2, the apparatus 21 may be contained in an enclosure.

Figure 3:
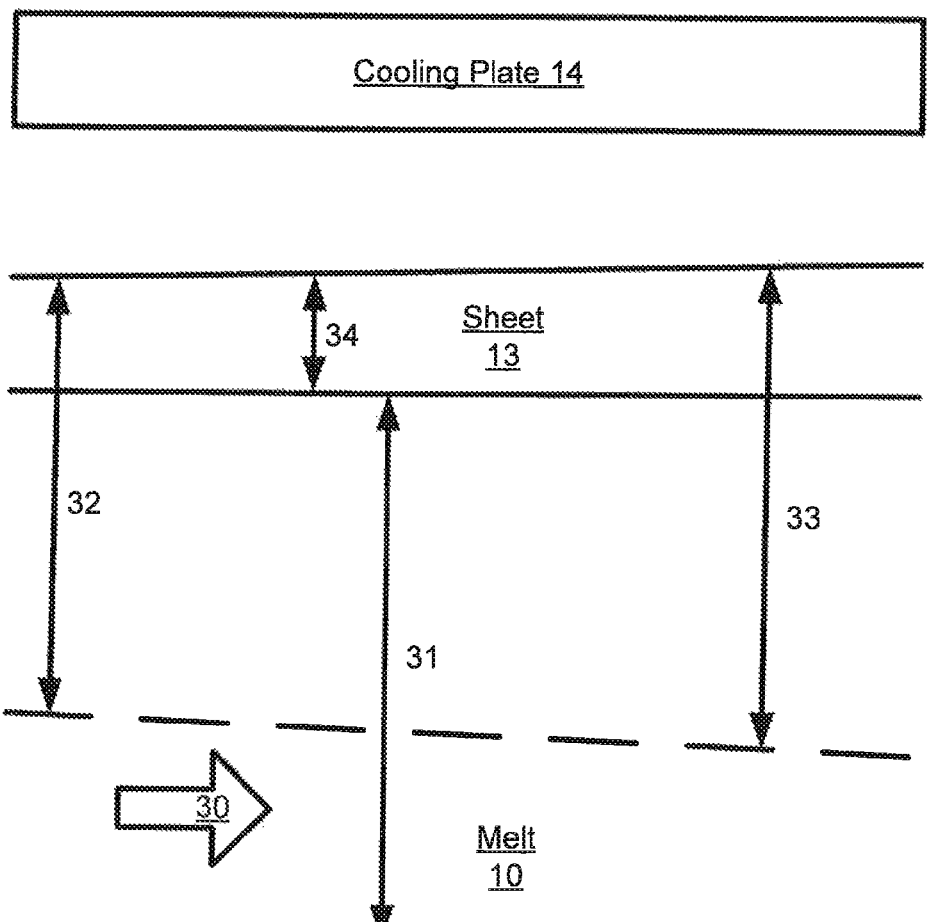
FIG. 3 is a cross-sectional side view of an embodiment of a sheet in a melt.

FIG. 3 is a cross-sectional side view of an embodiment of a sheet in a melt. FIG. 3 illustrates a sheet 13 in the melt 10 under a cooling plate 14 and is not to scale. The melt 10 and sheet 13 are flowing or being pulled in the direction represented by the arrow 30. The sheet 13 may grow in thickness as it flows or is pulled under the cooling plate 14.

Only some of the sheet 13 may protrude from the surface of the melt 10. The melt 10 may have a depth represented by dimension 31. The sheet 13 may grow in thickness as represented by the change between dimension 32 and dimension 33. However, only the portion of the sheet 13 represented by the dimension 34 is above the surface of the melt 10. The rest of the sheet 13 remains beneath the surface of the melt 10. In one example, only approximately 10% of the sheet 13 may protrude from the melt 10. Thus, if a 50 μm sheet 13 is desired, only 5 μm of the sheet 13 will protrude from the melt 10 when the desired thickness is reached.

Figure 4:
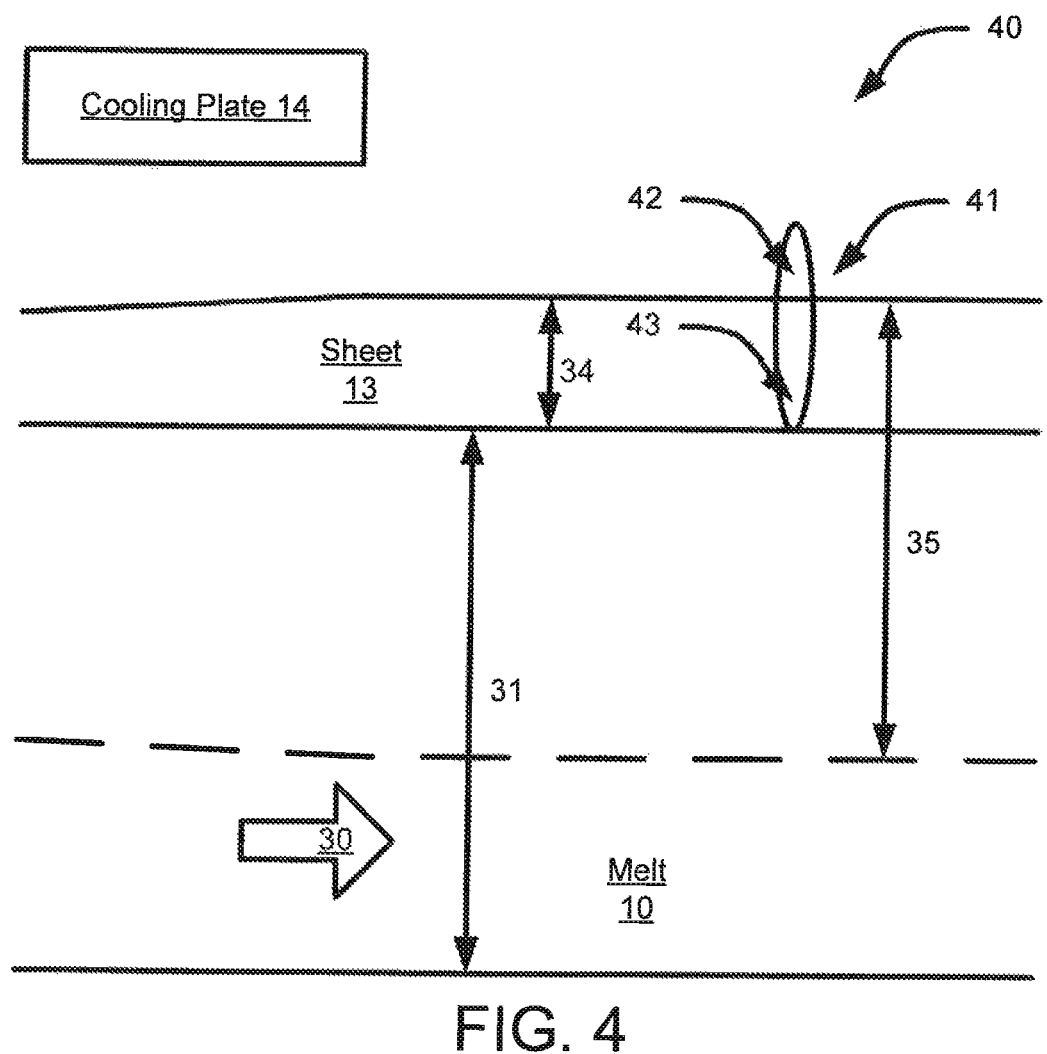
FIG. 4 is a cross-sectional side view of an embodiment of a sheet measurement apparatus.

FIG. 4 is a cross-sectional side view of an embodiment of a sheet measurement apparatus. The measurement unit 40 may be applied to the apparatus 21 or apparatus 23 of FIG. 1 or 2. However, the measurement unit 40 also may be applied to other systems where a solid sheet 13 forms on or in a liquid melt 10. Furthermore, while the measurement unit 40 is illustrated downstream of the cooling plate 14, it may be located upstream or further downstream than the position illustrated in FIG. 4 or in other locations known to those skilled in the art.

In one particular embodiment, the measurement unit 40 may be located under the cooling plate 14.

The measurement unit 40 calculates the height of the sheet 13 above the surface of the melt 10 represented by dimension 34. A beam 41 extends across the surface of the melt 10. A portion 42 of this beam 41 will not be blocked by the sheet 13. A portion 43 of this beam 41 will be blocked by the sheet 13. The portion 42 of this beam 41 not blocked by the sheet 13 will be measured. If the dimensions of the beam 41 are known, the height of the sheet 13 above the surface of the melt 10 may be calculated based on the measured portion 42 and portion 43. The beam 41 may be, for example, a laser, collimated light, x-rays, gamma radiation, other wavelengths of light, or other forms of energy that can be transmitted and received. However, in another embodiment anything that can be transmitted at or into the sheet 13 and that takes longer to traverse through the sheet 13 as the thickness increases may be used. The embodiments described herein are not solely limited to wavelengths of light. For example, vibrations or sonic energy may be used. The measurement unit 40 may be fixed or may be moveable.

The measurement unit 40 also may be used to calculate the total height of the sheet 13 represented by dimension 35. A control system (not illustrated) may calculate the total height of the sheet 13 (represented by the dimension 35) based on the height of the sheet 13 above the surface of the melt 10 (represented by dimension 34), the density of the sheet 13, and the density of the melt 10. One example of a formula to calculate this is:

$$(h_{total} - h_{measured})/h_{measured} = \rho_{sheet}/\rho_{melt}$$

wherein $h_{total}$ is the total height of the sheet 13, $h_{measured}$ is the height of the sheet 13 above the surface of the melt 10, $\rho_{sheet}$ is the density of the sheet 13, and $\rho_{melt}$ is the density of the melt 10. The total height of the sheet 13 (represented by the dimension 35) also may be calculated if the approximate percent of the total height of the sheet 13 that protrudes from the melt 10 is known. In one instance, approximately 10% of the sheet 13 protrudes from the melt 10. The height of the sheet 13 above the surface of the melt 10 (represented by dimension 34) may represent approximately 10% of the total height of the sheet 13 (represented by the dimension 35). Other methods known to those skilled in the art also may be used.

The speed the sheet 13 or melt 10 is moving also may be determined based on the passage of imperfections in the sheet 13 that block the measurement unit 40. This may use more than one measurement unit 40 to monitor the flow of the imperfections.

In an alternate embodiment, the measurement unit 40 is positioned such that the measurement unit 40 measures the sheet 13 at an angle. In FIG. 4, the measurement unit 40 projects a beam across the cross-section of the sheet 13. Projecting a beam at an angle may allow changes to be measured across the sheet 13.

Figure 5:
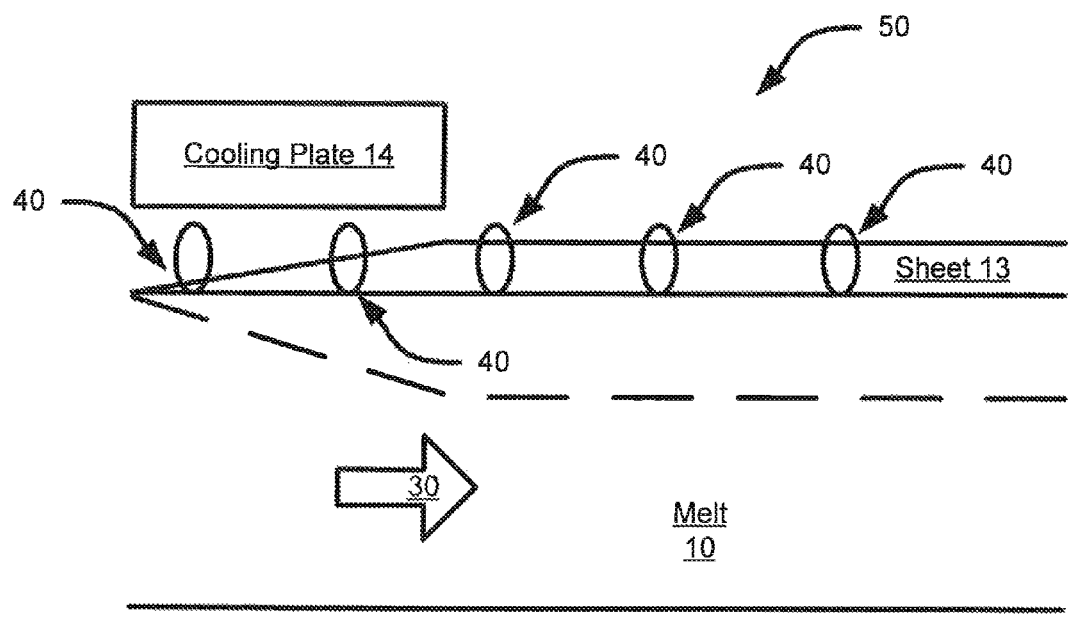
FIG. 5 is a cross-sectional side view of a second embodiment of a sheet measurement apparatus.

FIG. 5 is a cross-sectional side view of a second embodiment of a sheet measurement apparatus. In this embodiment, a measurement system 50 has multiple measurement units 40 that are along the direction the melt 10 and sheet 13 are flowing or being pulled as represented by the arrow 30. Other numbers of measurement units 40 and configurations of measurement units 40 than that illustrated in FIG. 5 are possible. The measurement system 50 can monitor the growth of the sheet 13 and the thickness of the sheet 13 as it flows or is pulled. The measurement system 50 also can monitor the amount the sheet 13 shrinks downstream of the cooling plate 14 as it melts back into the melt 10. As the sheet 13 grows or shrinks, the measurement units 40 will send different signals to the measurement system 50.

The measurement system 50 or individual measurement units 40 may measure the thickness of the sheet 13 floating on the melt 10 at a particular point or as the sheet 13 flows or is pulled, the total thickness of the sheet 13, the repeatability of the thickness of the sheet 13, the consistency of the thickness of the sheet 13 over its length, the growth rate of the sheet 13 versus the position in the apparatus 21 or apparatus 23, the growth rate of the sheet 13 as the sheet 13 is transported through the apparatus 21 or apparatus 23, the smoothness of the sheet 13, the roughness of the sheet 13, or the material condition of the sheet 13.

Figure 6:
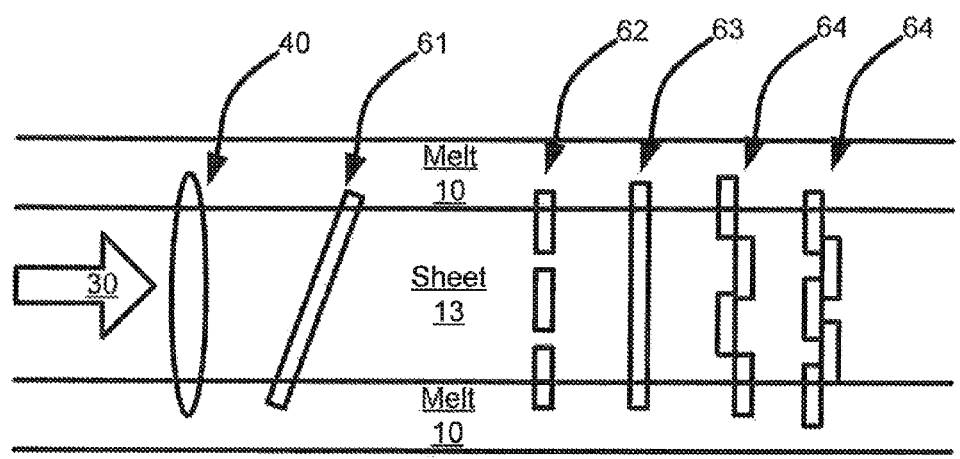
FIG. 6 is a plan view of a third embodiment of a sheet measurement apparatus.

FIG. 6 is a plan view of a third embodiment of a sheet measurement apparatus. This view looks at the sheet 13 in the melt 10 from the top. A measurement unit 40 may monitor the sheet 13 from the top. The difference in readings between the sheet 13 and the melt 10 may allow the measurement unit 40 to determine the width of the sheet 13 or the consistency of the width of the sheet 13 as it flows or is transported. An angled measurement unit 61 may be used to measure changes across the sheet 13. Stacked beams 62, rastered beams 63, offset beams 64, or overlapping beams 65 also may be used in some embodiments. Besides width or width consistency of the sheet 13, measurement 25 from the top of the sheet 13 also may determine composition of the sheet 13, roughness of the sheet 13, or the speed the sheet 13 or melt 10 is moving.

The Mossbauer Effect, or the resonant and recoil-free emission and absorption of gamma rays by atoms bound in a solid form, may be used to measure the sheet 13 in another embodiment. In a solid, the nuclei are bound to the lattice and do not recoil in the same way as in a liquid or gas. The lattice will recoil in a solid, but the recoil energy is negligible because the mass of the emitting or absorbing body is the mass of the whole lattice. In liquids or gases, emitting and absorbing bodies are atoms with a small mass. This results in a large recoil energy in a liquid or gas, which prevents resonance. Thus, the silicon atoms in the melt 10 have to absorb the recoil energy, but the entire solid sheet 13 can absorb the same recoil energy. Therefore, the absorption and emission energies are shifted between the solid sheet 13 and the liquid melt 10. The strength of the absorption at a specific energy will be higher in the solid sheet 13 than the liquid melt 10.

Figure 7:
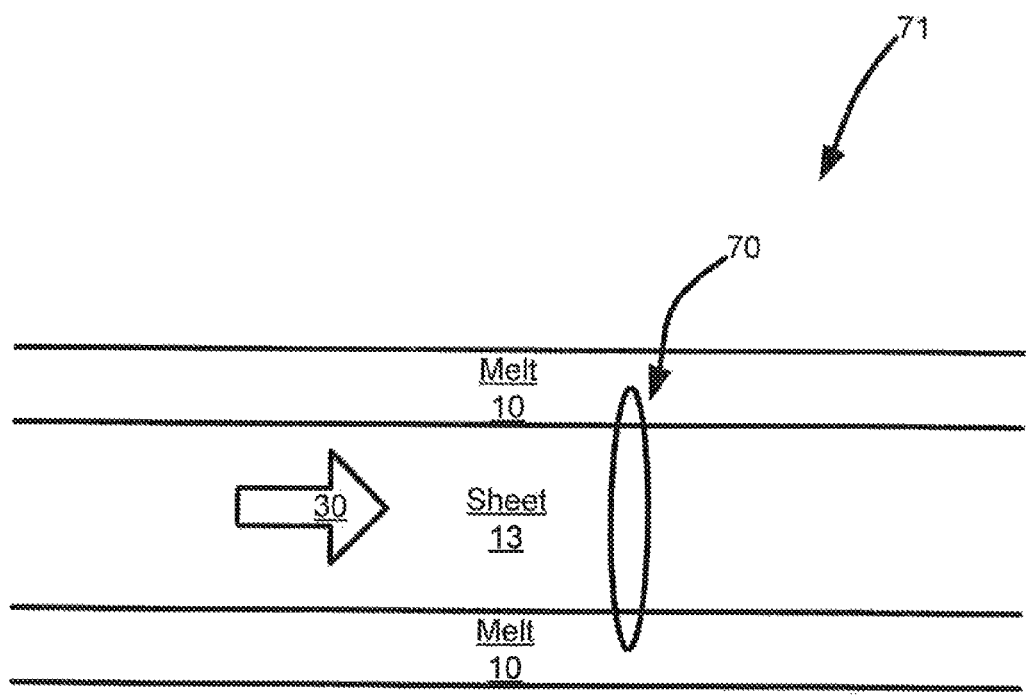
FIG. 7 is a plan view of a fourth embodiment of a sheet measurement apparatus.

FIG. 7 is a plan view of a fourth embodiment of a sheet measurement apparatus. This view looks at the sheet 13 in the melt 10 from the top. The Mossbauer Effect may be used to measure the properties of the sheet 13 by directing gamma rays 70 at the sheet 13 and measuring absorption with the measurement unit 71. In FIG. 7, gamma rays 70 are directed at the sheet 13 and melt 10. The gamma rays may be produced by an electron accelerator with a target made of, for example, tungsten. The gamma rays also may be produced by a radioactive source such as, for example 183 Ta.

Differing amounts of gamma rays 70 will be absorbed by the sheet 13 and the melt 10. The sheet 13 lattice absorbs in a narrow width because it is in a solid form whereas the liquid melt 10 has a broad absorption due to the Doppler Effect from the thermal velocity of the atoms. The width of the sheet 13 may be calculated. Furthermore, depending on the thickness of the sheet 13 and the depth the sheet 13 extends into the melt 10, different measurements will result. At a given point, there is a certain height of the sheet 13 and depth of the melt 10. This ratio of the sheet 13 height to melt 10 depth varies as the sheet 13 grows. This ratio may be measured using the gamma rays 70 and the overall height of the sheet 13 may be calculated based on the readings.

The gamma rays may be detected with a high resolution gamma ray detector such as a high-purity germanium detector or a silicon gamma detector. In the measurement unit 71, the gamma ray source is positioned either above or below the melt 10 and the detector is positioned opposite of the gamma ray source. In a specific embodiment, the gamma ray source is moved relative to the sheet 13 or melt 10. The detected flux is measured as a function of the velocity of the gamma ray source. In yet another embodiment, the gamma ray source and detector in the measurement unit 71 are disposed on the sides of the sheet 13 similar to FIG. 4 to measure the height of the sheet 13.

The different embodiments of the measurement units 40, measurement system 50, or measurement unit 71 disclosed herein may be part of a process control system. This process control system may control growth of the sheet 13 or the movement of the sheet 13 or melt 10. The process control system may change the properties of the sheet 13 or change a parameter of the growth or freezing process of the sheet 13. This process control system also may monitor where a particular portion of the sheet 13 is within the apparatus 21 or apparatus 23. In another embodiment, the process control system may assess the quality of the sheet 13 or detect irregularities or defects in the sheet 13. The temperature of the melt 10 or sheet 13 may be monitored by the process control system and this process control system may change the temperature of the cooling plate 14 or of other portions of the apparatus 21 or apparatus 23 to change the properties of the sheet 13. In another instance, the process control system may monitor the surface condition of the melt 10 or monitor the temperature of a portion of the apparatus 21 or apparatus 23. The process control system may alter parameters of the apparatus 21 or apparatus 23 based on signals from the measurement units 40, measurement system 50, measurement unit 71, or other feedback mechanisms.

In one specific embodiment, the apparatus 21 or apparatus 23 use a PID (proportional-integral-derivative) feedback loop using the measurement units 40, measurement system 50, or measurement unit 71. The PID feedback loop attempts to correct the error between a measured process variable and a desired value by calculating and then outputting a corrective action that may adjust the process. The PID feedback loop may attempt to maintain the desired sheet 13 dimensions.

In yet another embodiment, the process control system measures displacement of the melt 10 caused by the solidification of the sheet 13. In another particular embodiment, a paddle wheel or another apparatus is used to monitor the speed the melt 10 is flowing. In yet another embodiment, a non-contact optical thickness gauge for transparent multi-layer thin films is used to measure the sheet 13. This may be a broad spectrum reflection interferometer.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A sheet measurement apparatus comprising:
    a melt of a material;
    a sheet of said material that floats on a surface of said melt;
    a pump configured to cause said melt to flow;
    a cooling plate configured to use radiation cooling disposed a distance from said sheet; and
    a measurement system that uses a beam to determine a dimension of said sheet.

2. The sheet measurement apparatus of claim 1, wherein said beam is selected from the group consisting of collimated light, a laser, and x-rays.

3. The sheet measurement apparatus of claim 1, wherein said beam is a gamma ray.

4. The sheet measurement apparatus of claim 1, wherein said dimension is selected from the group consisting of height and width.

5. The sheet measurement apparatus of claim 1, wherein said measurement system comprises a plurality of measurement units.

6. The sheet measurement apparatus of claim 1, wherein said measurement system comprises at least one measurement unit, said measurement unit configured to determine a height of said sheet above a surface of said melt.

7. The sheet measurement apparatus of claim 6, further comprising a control system, said control system configured to calculate a total height of said sheet based on said height of said sheet above said surface of said melt, a density of said sheet, and a density of said melt.

8. The sheet measurement apparatus of claim 1, wherein said material comprises silicon or silicon and germanium.

9. A sheet measurement method comprising:
    freezing a sheet of a material in a melt of said material by radiation cooling;
    transporting said sheet floating on a surface of said melt wherein said sheet and said melt flow at approximately an equal speed; and
    measuring a width of said sheet across said melt using a beam.

10. The sheet measurement method of claim 9, wherein said beam is selected from the group consisting of collimated light, a laser, and x-rays.

11. The sheet measurement method of claim 9, wherein said beam is a gamma ray.

12. The sheet measurement method of claim 9, wherein said dimension width of said sheet is measured over time.

13. The sheet measurement method of claim 9, wherein said measuring determines a gowth rate of said sheet.

14. The sheet measurement method of claim 9, further comprising monitoring a consistency of said width over time.

15. The sheet measurement method of claim 9, further comprising adjusting a parameter of said freezing or said transporting based on said measuring.

16. The sheet measurement method of claim 9, further comprising adjusting a parameter of said freezing or said transporting using a feedback loop.

17. A sheet measurement method comprising:
    flowing a melt of a material through a channel;
    cooling said melt by radiation cooling;
    forming a sheet of said material that floats on a surface of said melt;
    flowing said sheet and said melt;
    measuring a height of said sheet above said surface of said melt using a beam with a first intensity, wherein a first portion of said beam is completely blocked by said sheet and a second portion of said beam not blocked by said sheet is used for said measuring, wherein said second portion has said first intensity and is projected above a surface of said sheet; and separating said sheet from said melt.

18. The sheet measurement method of claim 17, further comprising calculating a total height of said sheet based on said height of said sheet above said surface of said melt, a density of said sheet, and a density of said melt.

19. The sheet measurement method of claim 17, wherein said height of said sheet is measured over time.

20. The sheet measurement method of claim 17, further comprising adjusting a parameter of said cooling or said flowing based on said measuring.

\* \* \* \* \*